United States Patent [19]
Otto

[11] Patent Number: 6,163,606
[45] Date of Patent: *Dec. 19, 2000

[54] SYSTEM FOR PROVIDING VIRTUAL CALLED PARTY IDENTIFICATION IN A VOICE MAIL SYSTEM

[75] Inventor: Mary Rita Otto, Lisle, Ill.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 09/154,135

[22] Filed: Sep. 16, 1998

[51] Int. Cl.$^7$ ...................................................... H04M 3/58
[52] U.S. Cl. .......................... 379/211; 379/88.25; 379/213
[58] Field of Search ............................... 379/67.1, 70, 74, 379/93.01, 93.02, 93.03, 88.25, 88.26, 201, 210, 211, 212, 213

[56] References Cited

U.S. PATENT DOCUMENTS

| | | | |
|---|---|---|---|
| 4,876,717 | 10/1989 | Barron et al. | 380/25 |
| 4,878,243 | 10/1989 | Hashimoto | 379/211 |
| 5,077,789 | 12/1991 | Clark, Jr. et al. | 379/211 |
| 5,251,248 | 10/1993 | Tokunaga et al. | 455/461 |
| 5,255,314 | 10/1993 | Applegate et al. | 379/212 |
| 5,289,528 | 2/1994 | Ueno et al. | 379/67.1 |
| 5,351,285 | 9/1994 | Katz | 379/93.14 |
| 5,414,754 | 5/1995 | Pugh et al. | 379/88.23 |
| 5,450,488 | 9/1995 | Pugaczewski et al. | 379/67.1 |
| 5,467,388 | 11/1995 | Redd, Jr. et al. | 379/196 |
| 5,475,746 | 12/1995 | Miller et al. | 379/201 |
| 5,510,777 | 4/1996 | Pilc et al. | 340/825.31 |
| 5,581,611 | 12/1996 | Yunoki | 379/211 |
| 5,592,473 | 1/1997 | Matern et al. | 370/264 |
| 5,724,417 | 3/1998 | Bartholomew et al. | 379/211 |
| 5,734,709 | 3/1998 | DeWitt et al. | 379/207 |
| 5,764,639 | 6/1998 | Staples et al. | 370/401 |
| 5,764,747 | 6/1998 | Yue et al. | 379/210 |
| 5,768,348 | 6/1998 | Solomon et al. | 379/67.1 |

*Primary Examiner*—Krista Zele
*Assistant Examiner*—Roland G. Foster
*Attorney, Agent, or Firm*—Duft, Graziano & Forest, P.C.

[57] ABSTRACT

A telephone system having a voice mail system and supporting virtual telephone numbers for called parties. A switching system in the telephone system has a plurality of telephone lines connected to the switching system with each telephone line having a telephone number. Each called party in the system has a virtual telephone number that is not associated with a particular telephone line. When a called party desires to receive incoming telephone calls over a telephone line, the called party performs a log-in from the telephone line. The log-in causes the switching system to extend all calls specifying the virtual telephone number of the called party to the telephone line. If the incoming call is not answered, the call is extended to a voice mail system which records a message and stores the message in a voice mail box associated with the virtual telephone number of the called party. The called party then performs a log-out when the called party no longer desires to receive telephone calls at the telephone line and all incoming calls are extended directly to the voice mail system.

18 Claims, 8 Drawing Sheets

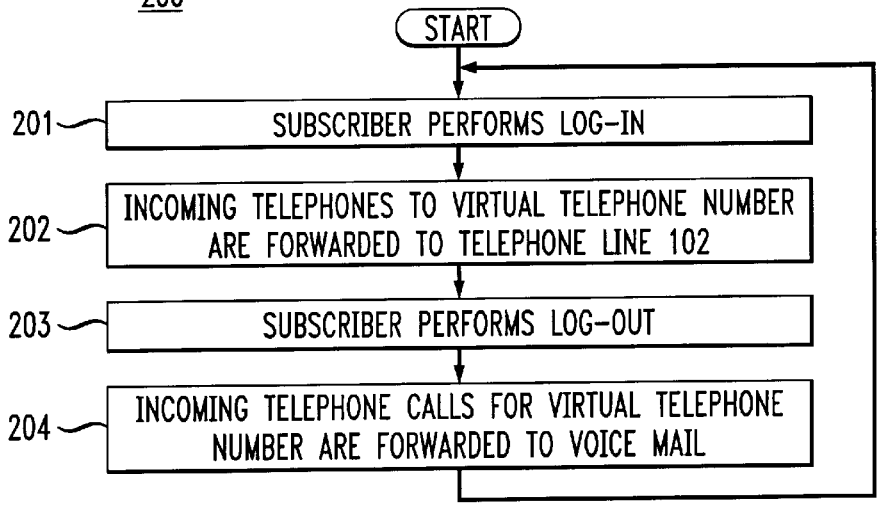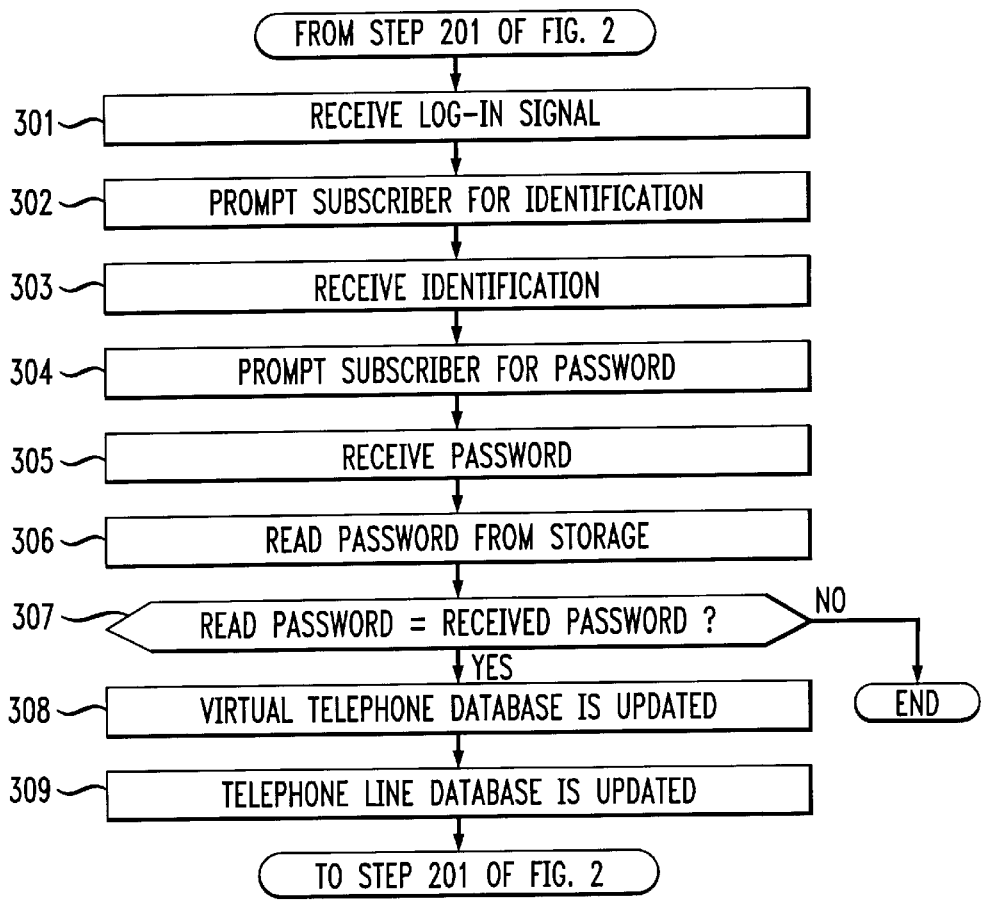

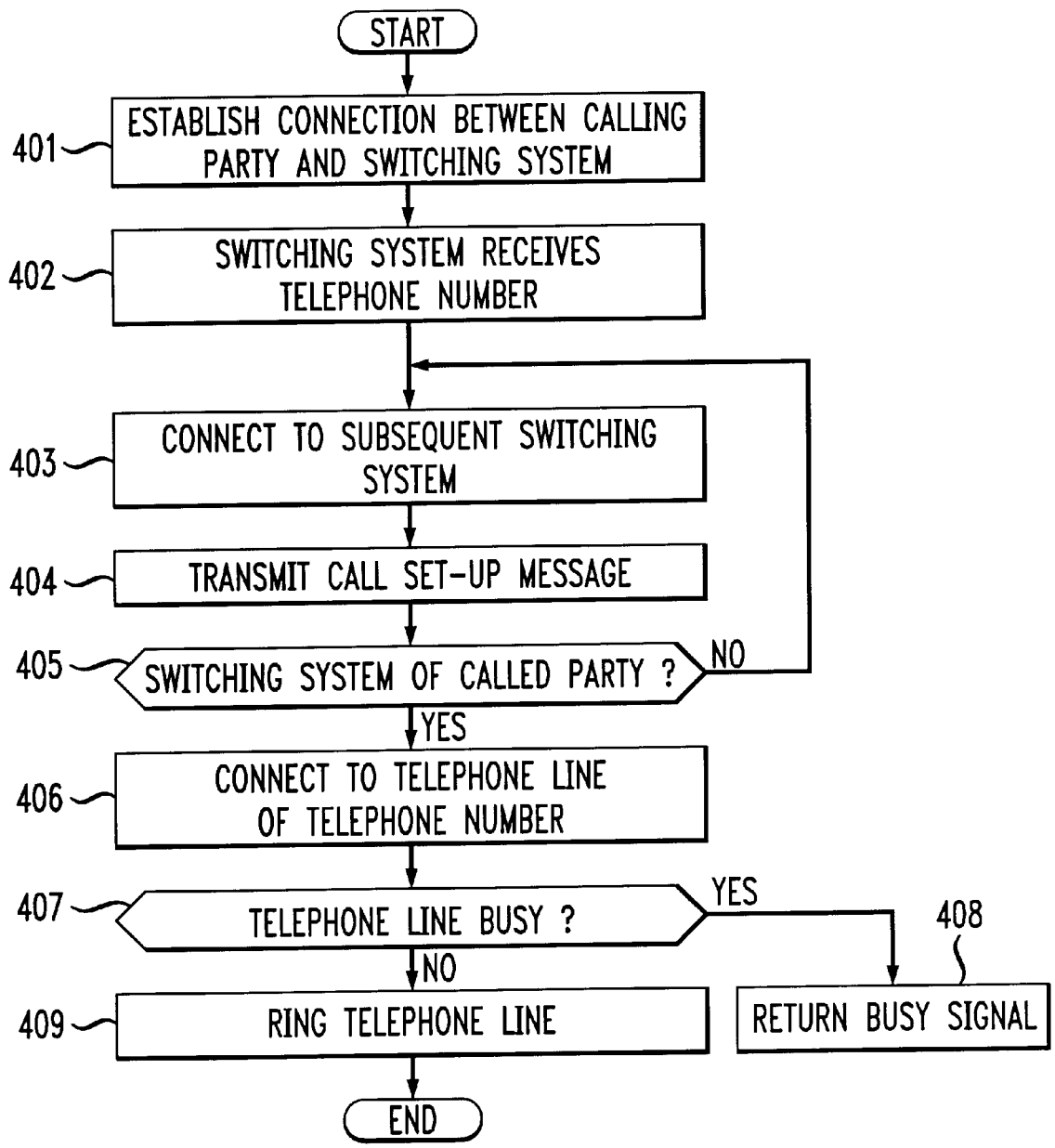

700

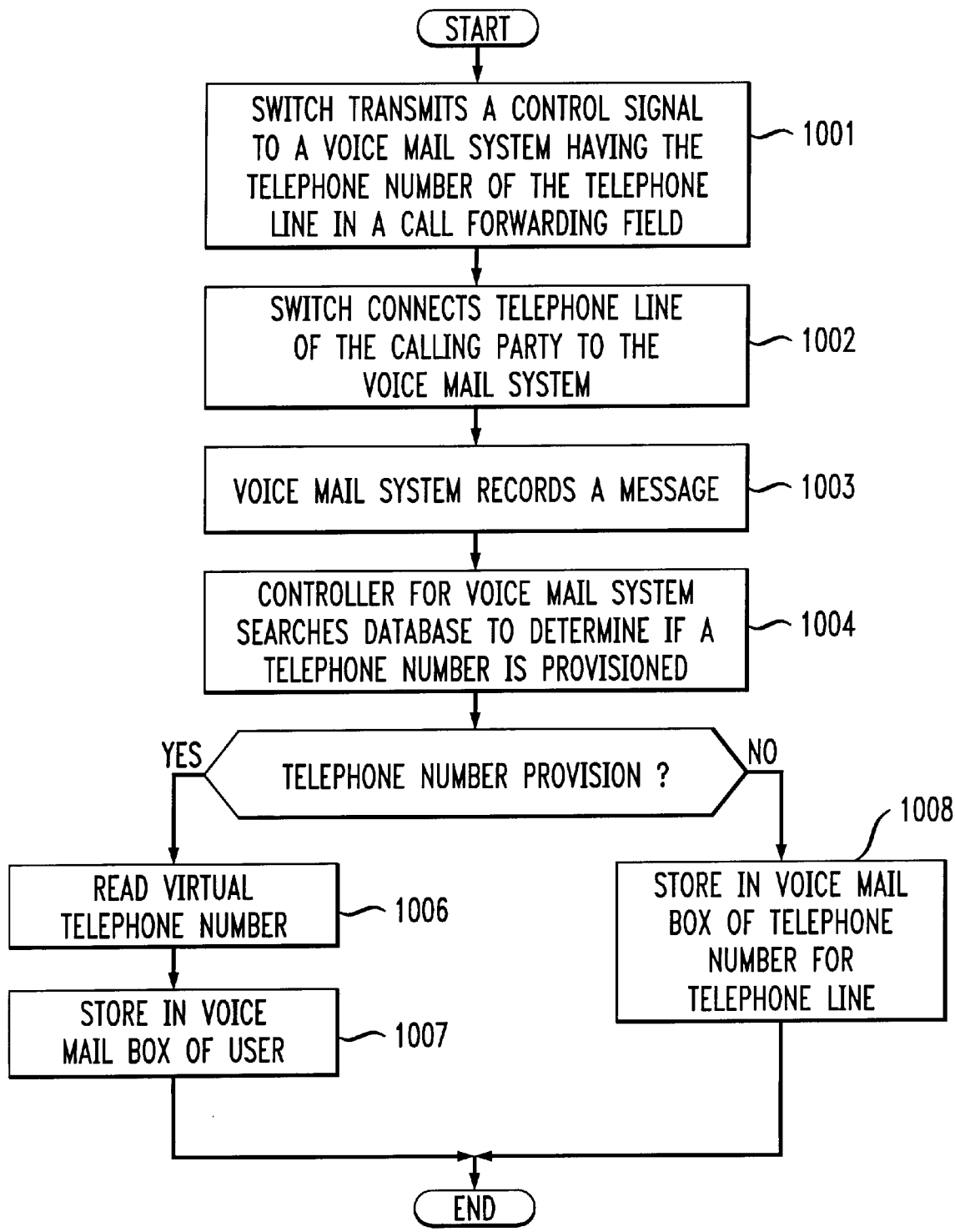

SYSTEM FOR PROVIDING VIRTUAL CALLED PARTY IDENTIFICATION IN A VOICE MAIL SYSTEM

FIELD OF THE INVENTION

This invention relates to a voice mail system wherein a plurality of users share a common telephone set. More particularly, the present invention relates to a system that extends incoming calls specifying a called party telephone number to a telephone line having a telephone number that is different from the called party number. The present invention also relates to a system for identifying the called party telephone number to a voice mail system after the call has been extended to a telephone line.

PROBLEM

It is a problem that sometimes more than one person must share a common telephone line. It is a particular problem that someone other than a called party to answer a telephone call that is intended for the called party. If the calling party leaves a message with the called party, there is no way to be assured that the called party will receive the message.

This particular problem is not solved by adding a voice mail system or answering machine to the telephone line. If a first called party answers a telephone call intended for a second called party, the first called party must write down the message or remember the message and give the message to the second called party. If the voice mail system or answering machine answers the telephone call, the first called party may still retrieve the message from the answering machine or voice mail system and must save the message in the message device for the proper called party or in some other way convey the message to the proper called party. A common result in these situations is that the message is not received by the intended called party or the message conveys the wrong information to the intended called party. Either of these alternative results is unacceptable to called parties.

One common place where this problem arises is a calling center. In a calling center, different called parties use the same telephone line during different work shifts to complete their work. Each of the called parties uses the telephone line during their shift and leaves. A subsequent called party then uses the same telephone line during the next shift. All of the called parties use the same voice mail box or answering system to receive messages. A person trying to reach a first called party at a time in which the first called party is not working must leave a message either with the subsequent called party or on an answering system and hope that the first called party receives the message. If the subsequent called party answers the call, the subsequent called party is interrupted in their work and burdened with handling messages for others. There is a need in the art to provide each called party of a common telephone line with a separate answering service to assure that each called party receives all of the telephone messages for the called party.

SOLUTION

The above and other problems are solved and an advance in the art is made by the provision of a voice mail system capable of supporting virtual called party telephone numbers. One advantage of a voice mail system capable of supporting virtual called party telephone numbers is multiple called parties may use a common physical telephone line and be assured that each called party will receive all incoming telephone calls and voice mail messages that are intended for the called party. A second advantage is the common telephone line may have a telephone number and may be used to receive and send telephone calls when no called parties with virtual telephone numbers are using the telephone line to receive telephone calls. A third advantage is that a called party can use any telephone line in the system and use the same telephone number and voice mail box to receive incoming telephone calls and messages.

In voice mail system supporting virtual telephone numbers, calls to virtual telephone numbers are extended in the following manner. To receive telephone calls at a telephone line, a called party performs a log-in. While the user is logged-in, telephone calls to the virtual telephone number of the party are extended to the telephone line. If the call is not answered in a predetermined time the call is then forwarded to the voice mail box of the called party. The called party performs a log-out when the called party no longer desires to receive call over the telephone line. When the called party is not logged-in on a telephone line, all call for the user are extended to the voice mail system.

The called party performs a log-in from a telephone line where the called party wants to receive incoming telephone calls in the following manner. One manner to perform a log-in is to dial a number that the switching system recognizes as a log-in number. The called party is then prompted for an identification and a password. The identification and password are compared to an identification and password stored in a called party database.

If the identification and password are correct, a database in the switching system is updated to indicate that incoming telephone calls for the virtual telephone number of the called party are to be forwarded to the telephone line used to perform the log-in. When an incoming call for the virtual telephone number is received while the called party is logged-in, the incoming telephone call is routed to the telephone line. If the incoming telephone call is not answered on the telephone line in a predetermined amount of time, such as six rings, the incoming call is forwarded to a voice mail system which answers the call and records a message. The message is then stored in the called party mail box associated with the virtual telephone number of the called party.

While the called party is logged-in to a telephone line, incoming telephone calls to the telephone line number are not connected to the telephone line. Instead these incoming calls are not completed. Alternatively, handling of incoming telephone calls for the telephone line number may be handled depending on the origination point of the call. For example, a call from another telephone line connected to the same switching system may be routed to the telephone line and a call from a line not connected directly to the same switching system may not be completed.

There are three alternative embodiments for supporting virtual telephone numbers in a voice mail system. In the first embodiment, the virtual telephone number of the incoming call is transmitted to the voice mail system when an incoming call is forwarded and the voice mail system uses the received virtual telephone number to determine which voice mail box to use for storing the message. In a second alternative embodiment, the telephone line number receiving the incoming call is transmitted to the voice mail system along with a flag indicating the call was intended for a virtual telephone number and the virtual telephone number. If a flag is received, the voice mail system uses a virtual telephone number to determine which voice mail box to use for storing a message. In the first and second embodiments, only databases used by the switching system must be updated on a log-in or a log-out to indicate where incoming telephone calls are to be routed. Software in the voice mail system may also have to be modified slightly to handle the virtual telephone numbers.

A third alternative embodiment requires that databases in both the switching system and voice mail system be updated when a log-in or a log-out is performed. In the third embodiment, the telephone line number from which an incoming call is forward is transmitted from the switching system to the voice mail system. If an incoming telephone call for a virtual telephone number is not answered, the incoming call is forwarded to the voice mail system. The telephone line number is transmitted to the voice mail system. The voice mail system receives the telephone line number and reads a record in a telephone number database to determine if a virtual telephone number is receiving incoming calls at that telephone number. If it is determined that a virtual telephone numbers is receiving incoming telephone calls at the received telephone number, the voice mail systems stores the message in the voice mail box of the virtual telephone number.

When the called party no longer desires to receive incoming telephone calls on the telephone line, the called party performs a log-out. The called party performs a log-out by dialing a number that indicates to the switching system that a log-out is being performed. Alternatively, a log-out may be a timed event that occurs a specified period of time after a called party performs a log-in. The log-out may require the called party to enter the identification and password to ensure that the called party is performing the log-out. After the log-out is performed, incoming telephone calls to the virtual telephone number are forwarded directly to the voice mail system and incoming calls for the telephone line number are routed to the telephone line.

DESCRIPTION OF THE DRAWINGS

The present invention can be understood by reading the detailed description below in conjunction with the following drawings:

FIG. 2 is a flow diagram of an operational overview of a telephone system supporting virtual called parties;

FIG. 3 is a flow diagram of a log-in process for a called party;

FIG. 4 is a flow diagram of a process for placing an incoming telephone call;

FIG. 10 is a flow diagram of the third embodiment of a process for receiving an incoming telephone call in a voice mail system;

DETAILED DESCRIPTION

Figure 1:
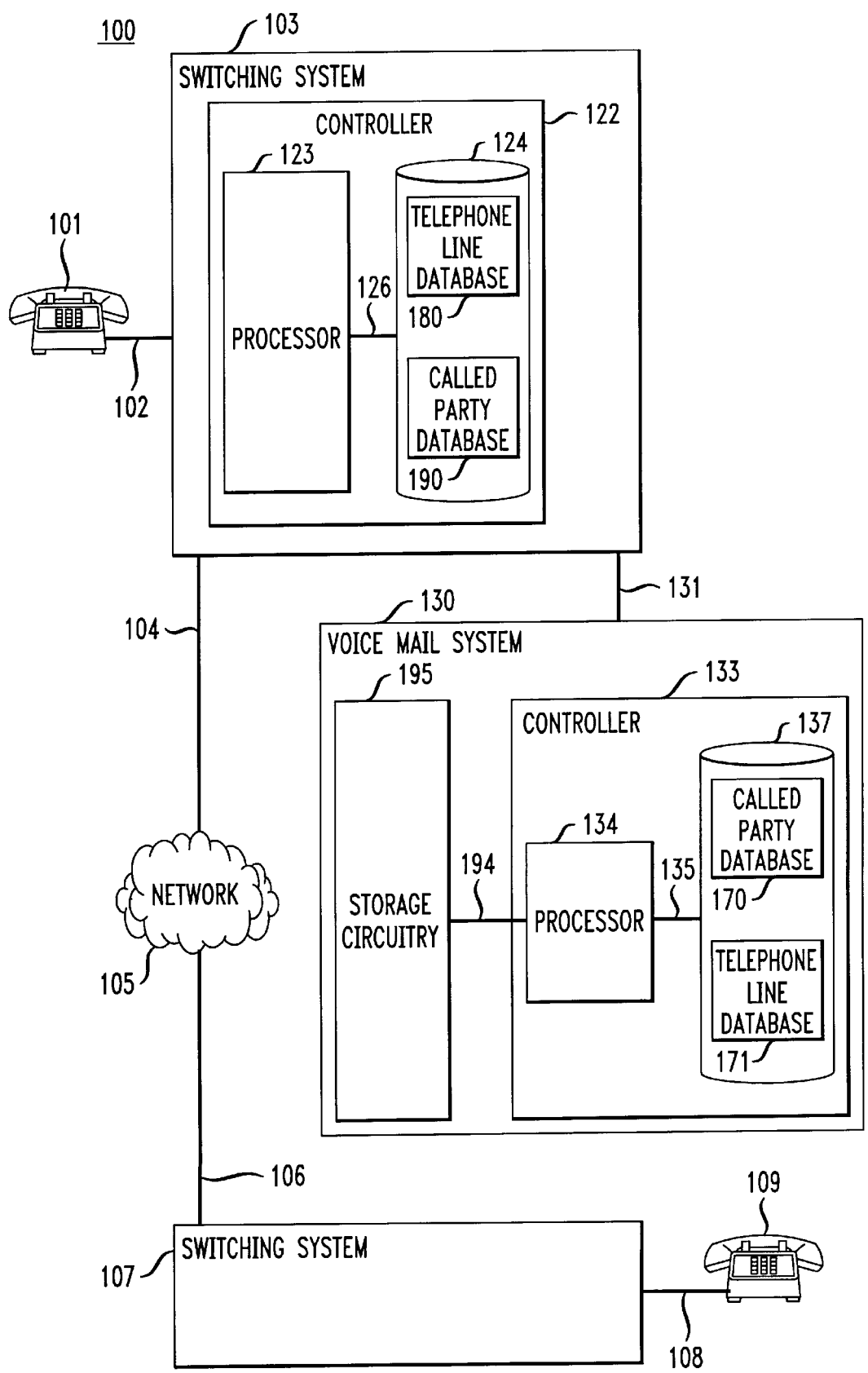
FIG. 1 is a telephone system having a voice mail system that supports virtual called parties.

A Telephone System Having a Voice Mail System and Supporting Virtual Called Parties—FIG. 1.

FIG. 1 illustrates a telephone system 100 having a voice mail system 130 and supporting virtual called parties. In order to describe the processes for supporting virtual called parties, the reference numerals of elements illustrated in FIG. 1 are referred to throughout the entirety of this detailed description. In telephone system 100, there is at least one telephone set 101 connected to a switching system 103 via a telephone line 102. Switching system 103 is connected to a telephone network 105 via telecommunications path 104 which includes trunks connecting switching system 103 to other switching systems in network 105. A calling party has a calling party telephone set 109 connected to a second switching system 107 via telephone line 108. Switching system 107 is in turn connected to telephone network 105 via communications path 106. Voice mail system 130 is also connected to switching system 103 via path 131.

Called party telephone set 101 is a well known and commonly available telephone set. Switching system 103 is a well known switching system such as a private branch exchange (PBX) switching system. One example of a PBX switching system is a Definity Enterprise Comm Server Model G3R. A switch controller 122 controls the operation of switching system 103. Processor 123 inside controller 122 is a processing system which executes instructions stored in a connected memory to perform the functions of switch controller 122. A memory 124 connected to processor 123 via bus 126 stores data for use in the operation of switching system 103.

Figure 11:
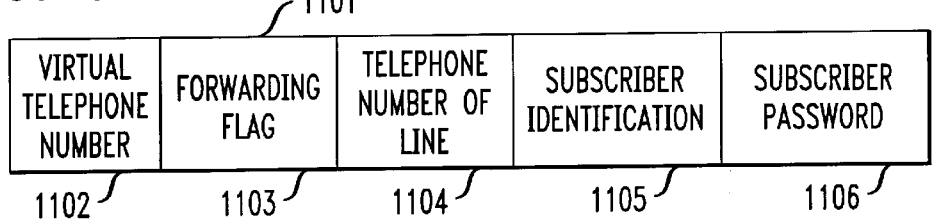
FIG. 11 is a block diagram of a data structure of a record in virtual telephone number database stored in a switching system.

In order to support virtual called parties, memory 124 includes a database of called party telephone numbers 190. Database 190 includes records as illustrated in FIG. 11. Each record 1101 contains a field 1102 for the virtual called party telephone number, a field 1103 indicating calls are forwarded, field 1104 for the telephone line number to receive incoming calls, field 1105 for a called party identification, and a field 1106 for a called party password. Memory 124 also contains a database 180 of telephone which give the current status of a telephone line. In a system supporting virtual called parties, database 180 contains records which include a first field indicating a telephone line receiving calls for the virtual called party telephone number and a second field for the telephone number of the virtual called party. Although for simplicity the above features are described as databases, it is envisioned one skilled in the art could develop other types of data structures to perform the functions of the above-described databases.

Voice mail system 130 is also connected to switching system 103 via telephone line 131. Voice mail system 130 is a well known voice mail system, such as an Intuit Audix Voice Mail System, for receiving incoming telephone calls forwarded from other telephone lines connected to switching system 103 and for recording and storing voice messages from the calling parties. Storage Circuitry 195 comprises the storage devices for storing digital and/or analog telephone messages for users. Storage device circuitry is connected to a voice mail system controller via path 195. A voice mail controller 133 controls the operations performed by voice mail system 130. Voice mail controller 133 includes a processor 134 which executes instructions stored in a memory to perform the processes necessary to operate voice mail system 130. A storage device such as a tape drive 137 is connected to processor 134 via bus 135 to store data needed to perform the voice mail processes including the processes needed to support virtual called parties. In order to support virtual called parties, tape drive 137 may store a called party telephone number database 170 and a provisioned telephone number database 171.

In order to provide connections between telephone line 102 and other telephone lines 108 connected to other switching systems 107, switching system 103 is connected to telephone network 105 via telecommunications path 104 which comprises multiple trunks connected to other switching systems 107 in network 105. Other switching systems 107 are also connected to network 105 via telecommunications path 106 which comprises multiple trunks connecting switching system 107 to other switching systems and other devices in network 105.

For exemplary purposes, a calling party telephone line 108 is depicted connected to switching system 107. However, it also possible for calling party telephone line 108 to be connected directly to switching system 103. A calling party uses calling party telephone set 109 for communication with telephone system 100 via telephone line 108.

Operational Overview of a Process of Forwarding Incoming Telephone Calls to a Virtual Called Party—FIG. 2.

In phone system 100, a called party may have a virtual telephone number. A virtual telephone number is a telephone number that is not associated with a telephone line connected to the switch. Instead, the called party may perform a log-in process from any telephone line 102 connected to switching system 103 and have incoming telephone calls directed to the virtual telephone number of the called party forwarded to the phone line from where the log-in takes place. FIG. 2 is a flow diagram of an operational overview for processing incoming telephone calls to a virtual telephone number of a called party.

Process 200 begins in step 201 in which a called party performs a log-in from a telephone line 102 connected to a switching system 103. A log-in process is described in process 300 illustrated in FIG. 3. In step 202, switching system 103 forwards all incoming telephone calls for the virtual telephone number of a called party to the telephone line 102 from which the called party performed the log-in. All incoming telephone calls for the called party telephone number are forwarded to telephone line 102 while the called party is logged-in. The called party performs a log-out routine in step 203 which disassociates the called party telephone number and telephone line 102, and incoming telephone calls to the called party telephone number are no longer forwarded to telephone line 102. Instead, incoming telephone calls for the called party telephone number are forwarded directly to voice mail system 130 in step 204. Process 200 is then repeated next time the called party performs a log-in routine.

Log-in Process for a Called Party Having a Virtual Telephone Number—FIG. 3.

Log-in process 300 associates a virtual telephone number with a telephone line 102 for receiving incoming telephone calls for the virtual telephone number. Process 300 begins in step 301 in which switching system 103 receives a log-in signal from telephone set 101 via telephone line 102. The log-in signal may be an in band or out of band signal sent from telephone set 101 or may be a dialed telephone number indicating a log-in system. In response to receiving the log-in signal, process 300 prompts the called party for an identification in step 302. The identification may be a called party identification code input by touch tone signal from telephone set 101 or the called party telephone number input using touch tone signals. In step 303, the identification is received. After the identification has been received, the called party is prompted to input a password in step 304 and the password is received from the called party in step 305. In step 306, the password associated with the called party identification is read from storage. The read password and received password are then compared in step 307.

If the passwords are not equal, process 300 ends. If the passwords are equal, the virtual telephone number database is updated in step 308 to indicate that the incoming telephone calls for the virtual telephone number are to be forwarded to telephone line 102 having a different telephone number. In step 309, the telephone number database for telephone line connected to switching system 103 is updated to indicate that telephone line 102 is provisioned to receive incoming telephone calls for the virtual telephone number. Process 300 then ends and returns to step 201 of FIG. 2.

Process for Receiving an Incoming Telephone Call at Switching System 103—FIG. 4.

A process for placing a call to a telephone number is illustrated in FIG. 4 to show how call forwarding to telephone line 102 is provided when receiving an incoming telephone call. Process 400 begins in step 401 by establishing a connection between calling party telephone set 109 and switching system 107 via telephone line 108. The connection is established by taking a receiver off a hook on telephone set 109. In step 402, switching system 107 receives a called party telephone number from telephone set 109. The switching system then routes the telephone call to the proper telephone number by selecting a proper trunk in communications path 106 to connect to a subsequent switching system in step 403 and transmits a call set-up message to the subsequent switching system in step 404. In step 405, it is determined if the telephone number that is to receive the call is connected to the subsequent switch.

If the subsequent switching system is not the switching system that is to receive the incoming telephone call, steps 403 and 404 are repeated. If the subsequent switching system is the switch that receives the incoming telephone call, the switching signal forwards the telephone call to the proper line in step 406. The process of forwarding the incoming telephone call for a virtual number takes place in step 406. In step 407, switching system 103 determines if telephone phone line 102 receiving the call is busy. If telephone line 102 is busy, a busy signal is transmitted to telephone line 108 via telephone network 105 in step 408. If telephone line 102 is not busy, switching system 103 transmits a ring voltage over telephone line 102 in step 409 until the call is answered or the calling party terminates the request.

Figure 5:
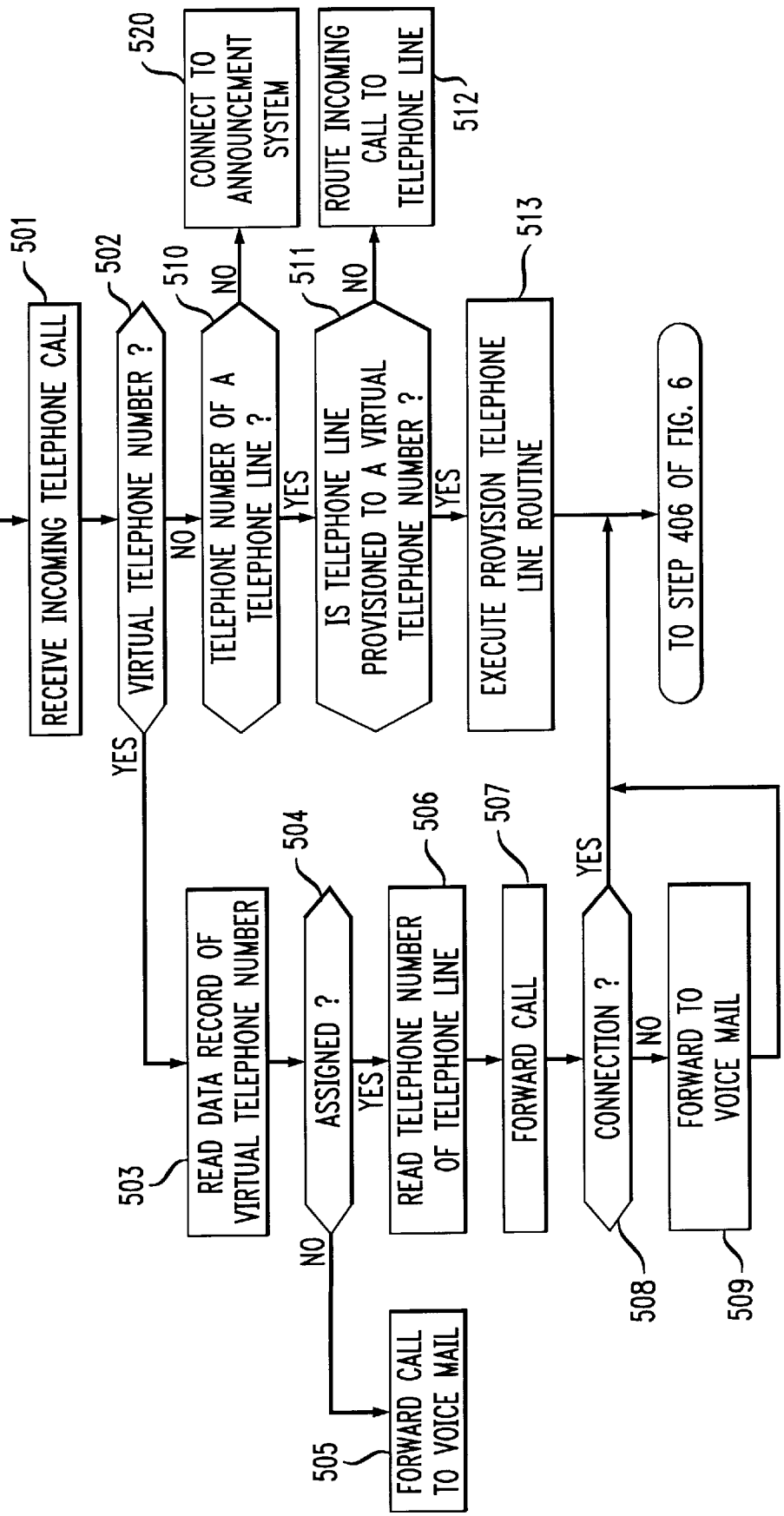
FIG. 5 is a flow diagram of a process of receiving incoming telephone call in a switching system supporting virtual called parties.

Process for Routing an Incoming Telephone Call in a Switching System—FIG. 5.

Process 500, illustrated in FIG. 5, is a process that routes an incoming telephone call to the proper telephone line 102. Process 500 begins in step 501 in which an incoming telephone call to a telephone number serviced by switching system 103 is received. In step 502, it is determined whether the incoming call is for a virtual telephone number. If the incoming call is for a virtual telephone number, process 500 proceeds to step 503. Otherwise, it is determined whether the incoming telephone call is for a telephone number associated with a telephone line connected to switching system 103 in step 510.

Figure 6:
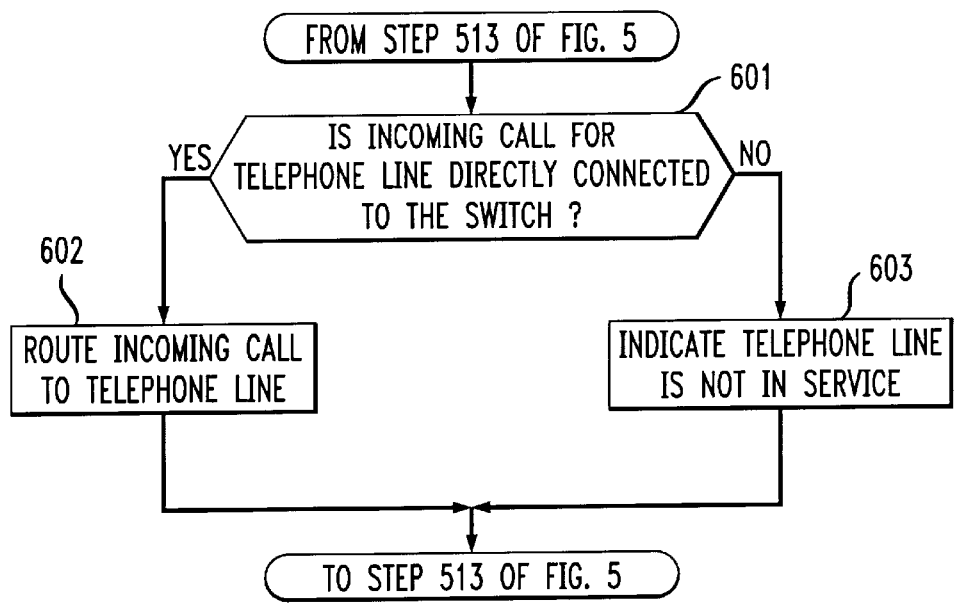
FIG. 6 is a flow diagram for routing an incoming telephone call to a telephone number of a telephone line.

If the incoming telephone call is not for a telephone number of a telephone line connected to switching system 103, the switching system connects the calling party telephone line to a voice announcement system that plays a recording telling the called party that the number called is no longer in service in step 520. If the telephone number represents a telephone line served by switching system 103, process 500 determines whether the telephone line of the telephone number is provisioned to a virtual called party that has performed a log-in from telephone line 102 in step 511. If the telephone line is not provisioned for a virtual telephone number, the incoming telephone call is routed to telephone line 102 in step 512. If the telephone line is provisioned to a virtual telephone number, a provisioned telephone line routine as described by process 600 in FIG. 6 is executed in step 513. Alternatively, the incoming telephone call can be completed by establishing a connection with a voice announcement and the telephone line of the calling party. A prerecorded announcement stating that the telephone number request is not in service is played by the voice announcement system after the connection has been established.

If the incoming telephone call is for a virtual telephone number, the data record for the virtual telephone number is read from the virtual telephone number database in step 503. In step 504, the data record is read to determine if the virtual telephone number is currently assigned to a telephone line. If the virtual phone number is not assigned, the incoming telephone call is forwarded to voice mail system 120 in step 505. If the virtual telephone number is assigned, the telephone line number assigned to receive incoming telephone call for the virtual number is read in step 506. In step 507, the telephone call is forwarded to the telephone line read in step 506. Process 500 determines if a connection has been established in a specified amount of time, such as six ring cycles, in step 508. If the call has not been answered, the incoming telephone call is forwarded to voice mail system 120 in step 509.

Process for Determining a Destination of an Incoming Telephone Call to a Telephone Number of a Telephone Line Receiving Telephone Calls for a Virtual Telephone Number—FIG. 6.

Process 600 is an embodiment of step 513 of FIG. 5. Process 600 begins by determining whether an incoming call is from an incoming telephone line 108 on switching system 103 or from a telephone line 108 on another switching system 107. If the incoming telephone call is from telephone line 108 connected directly to switching system 103, the incoming telephone call is forwarded to the telephone line of the telephone number in step 602. If the incoming telephone call is from a telephone line 108 connected to another switching system 107, the incoming telephone line 108 is connected to a voice announcement system which plays an announcement that the telephone number called is not in service in step 603.

Figure 7:
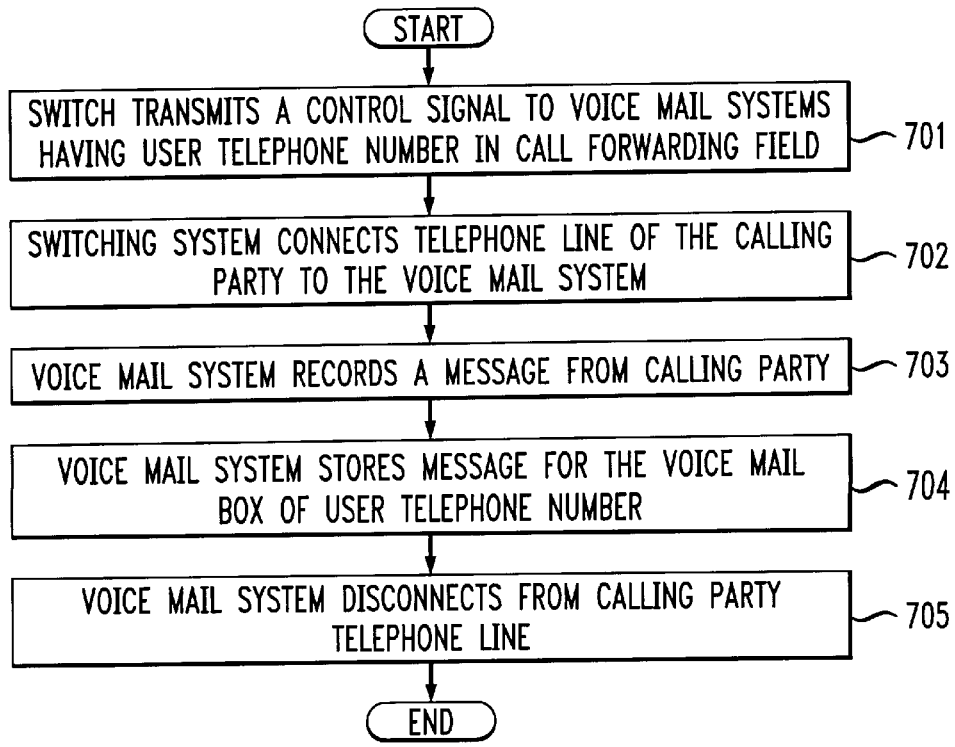
FIG. 7 is a flow diagram of a first embodiment of a process for receiving an incoming telephone call in a voice mail system.
Figure 8:
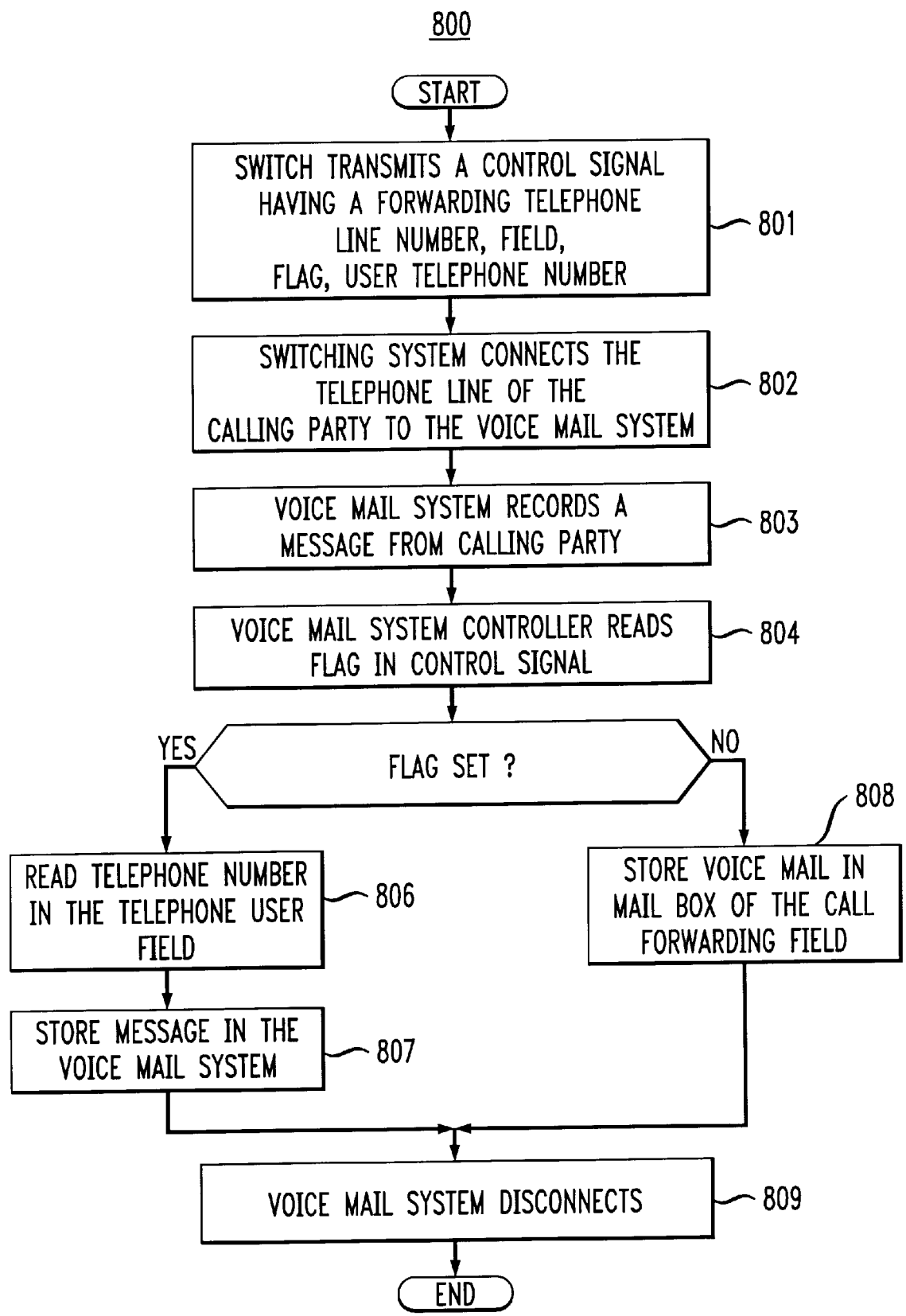
FIG. 8 is a flow diagram of a second embodiment of a process for receiving an incoming telephone call in a voice mail system.
Figure 9:
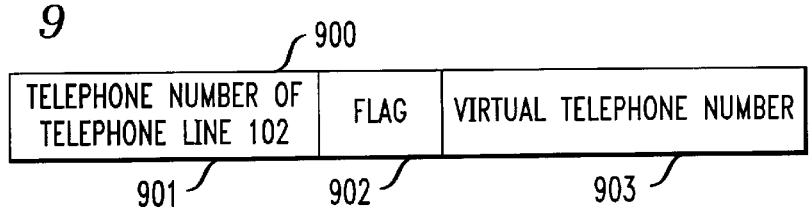
FIG. 9 is a block diagram of a control message sent to a voice mail system in a third embodiment of the present invention.

Processes for Storing Voice Mail Messages for Virtual Telephone Numbers—FIGS. 7–9.

In order to store telephone messages in the proper voice mail box, voice mail system 121 must receive a call forwarding message containing the telephone number that is having an incoming telephone call forwarded to voice mail system 130. FIGS. 7–10 illustrate three different embodiments for receiving a message and determining which voice mail box must store the message. Each different embodiment is based upon the different type of data passed from switching system 103 to voice mail system 121 when an incoming telephone call is forwarded.

First Alternative Embodiment Wherein the Virtual Telephone Number of the Called Party is Transmitted to a Voice Mail System—FIG. 7

In a first alternative embodiment, the virtual telephone number of the called party is placed in a call forwarding field of the call forwarding message passed to the voice mail system 130. The virtual called party telephone number is simply substituted for the telephone line number provisioned to receive incoming telephone calls for the virtual telephone number. Process 700, illustrated in FIG. 7, is the process executed by the voice mail system 121 for the first embodiment.

Process 700 begins in step 701 with the controller 122 of switching system 103 transmitting a control message to controller 133 of voice mail system 130. The switching system 103 connects the telephone line of the incoming call to voice mail system 130 which answers the telephone call in step 702. In step 703, voice mail system 130 records a message. In step 704, voice mail controller 133 reads the virtual telephone number from the call forwarding field and uses the virtual telephone number to store the message in the voice mail box of the virtual called party. Voice mail system 130 then disconnects from calling party telephone line 108 in step 705 ending process 700.

A Second Alternative Embodiment for A Voice Mail System Supporting Virtual Telephone Numbers—FIGS. 8 and 9.

In a second alternative embodiment, switching system 103 generates a call forwarding message having a data structure, such as the data structure illustrated in FIG. 9, and transmits the data structure to voice mail system 120. As illustrated in FIG. 9, voice mail message 900 has three fields. Field 901 contains the telephone number of telephone line 102 that forwards the incoming telephone call. A flag in field 902 indicates whether the incoming telephone call is for a virtual telephone number and field 903 contains a virtual telephone number if the incoming telephone call is for a virtual telephone number. In order to support virtual phone numbers in the third embodiment, the software in voice mail system controller 133 must be modified to search for the flag in the call forwarding message and to read the virtual telephone number if the flag is set.

Process 800, illustrated in FIG. 8, is the modified process for recording and storing messages in voice mail system 121 in a second embodiment of the present invention. In step 801, process 800 begins by receiving a call forwarding message from switching system 103 in accordance with the data structure of the third embodiment. Switching system 103 connects calling party line 108 to voice mail system 120 in step 802. A message from the calling party is recorded in step 803. In step 804, voice mail system controller 133 reads the call forwarding message and determines if the flag in field 902 is set in step 805. If the flag is set, voice mail controller reads the virtual telephone number in field 903 in step 806 and stores the voice mail message to the voice mail box for the read virtual telephone number in step 807. Otherwise, the telephone number of telephone line 102 in field 901 is read in step 808 and the message is stored in the voice mail box of the telephone number of telephone line 102 in step 809.

A Third Alternative Embodiment wherein the Telephone Line Number Receiving the Incoming Telephone Call is Transmitted to a Voice Mail System—FIG. 10.

In a third alternative embodiment, switching system 103 transmits the telephone number of telephone line 102 to voice mail system 130 when a telephone call is forwarded to voice mail system 130. In this embodiment, the called party virtual telephone number is not substituted for the telephone number of telephone line 102 while the called party is logged-in to telephone line 102. Instead, switching system 103 operates in the same manner that it would function for any call received by telephone line 102. In order for voice mail system 130 to support virtual telephone numbers in the second embodiment, databases in both switching system 103 and voice mail 130 must be updated upon a log-in. This allows the voice mail system 130 to track which virtual telephone numbers are assigned to telephone line 102.

Process 1000, illustrated in FIG. 10, is the process for storing voice mail messages in the correct voice mail box in accordance with the second embodiment. In step 1001, process 1000 begins by voice mail system 120 receiving a transmission from switching system 103 indicating an incoming telephone call is being forwarded to voice mail system 121. In the message, voice mail system 121 receives a telephone number of telephone line 102 which has forwarded the incoming telephone call. Calling party telephone line 108 is connected to voice mail system 130 in step 1002. In step 1003, voice mail system 130 records a message from the calling party.

In step 1004, controller 133 of voice mail system 130 reads the record in the telephone number database for the incoming telephone number. In step 1005, it is determined from a reading of the data record whether the telephone number in the call forwarded message is for telephone line 102 provisioned to a virtual telephone number. If the telephone number is for telephone line 102 provisioned to a virtual telephone number, process 1000 reads the virtual telephone number from the record in step 1006 and stores the voice mail message in the voice mail box of the virtual telephone number in step 1007. If telephone line 102 is not provisioned to a virtual telephone number, the message is stored in the voice mail box of for the telephone number of telephone line 102 in step 1008.

Figure 12:
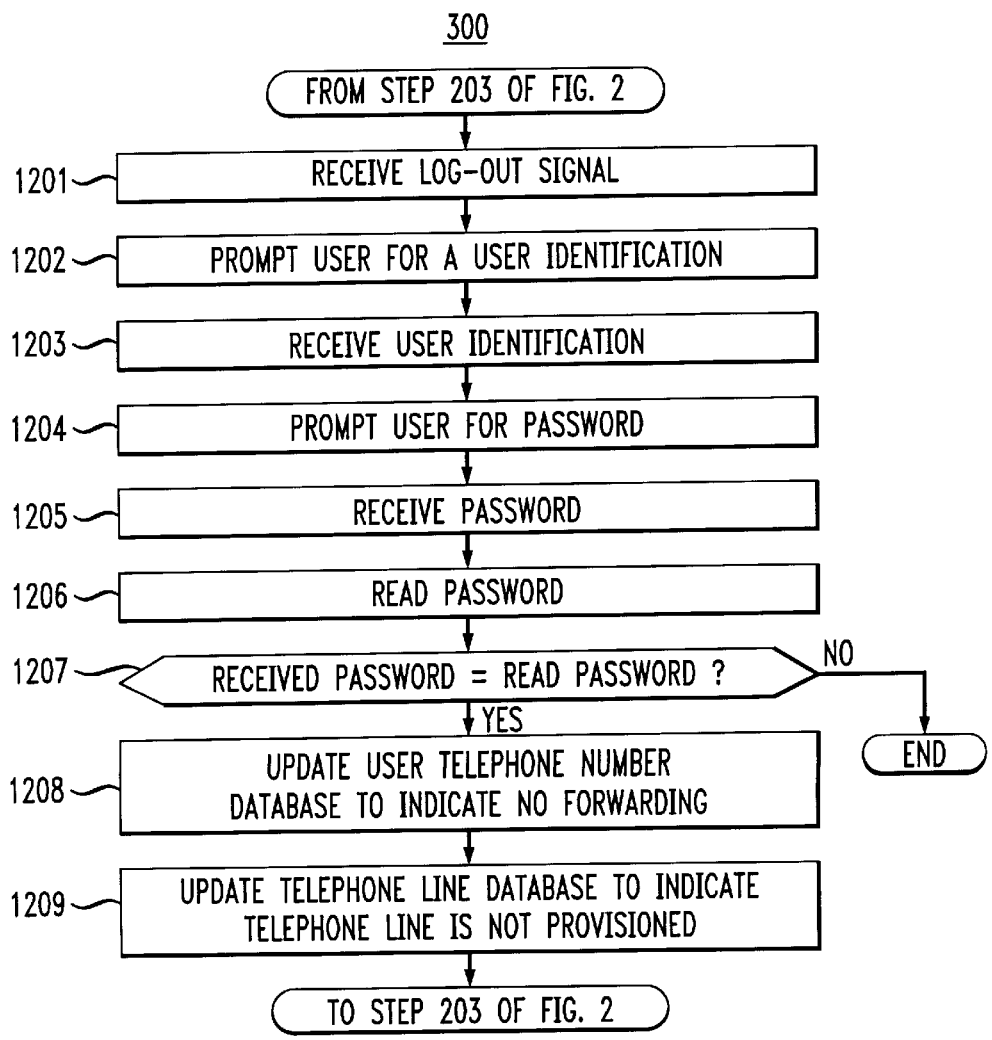
FIG. 12 is flow diagram of a log-out process.

Process for Performing a Log-out—FIG. 12.

When a called party no longer desires to receive incoming telephone calls with telephone line 102, the called party performs a log-out which disassociates the virtual telephone number of the called party and telephone line 102. A log-out process 1200 is illustrated in FIG. 12. Process 1200 begins in step 1201 with switching system 103 receiving a log-out signal for telephone set 101 via telephone line 102. The log-out signal may be a dialed number or an out of band signal generated by circuitry inside telephone set 101 in response to a button being depressed by a called party. In response to receiving a log-out signal, a called party is prompted for an identification in step 1202. The input called party identification is-received in step 1203. Process 1200 then prompts the called party for a password in step 1203 and the password is received in step 1204. In step 1205, a password for the identification of a called party is read from a record in a database. The read password and received password are compared in step 1206. If the passwords are equal, virtual telephone number database 180 is updated to indicate that incoming telephone calls should not be forwarded in step 1207 and telephone line database 190 is updated in step 1208 to indicate that telephone line 102 is no longer provisioned to receive incoming telephone calls for a virtual telephone number.

The above is a description of possible embodiments of a telephone system having a voice mail system supporting virtual telephone numbers. It is envisioned that those skilled in the art can and will design systems that infringe on the system of the present invention as claimed below, either literally or through the Doctrine of Equivalents.

What is claimed is:

1. A telephone switching system providing virtual called party identification for a voice mail system comprising:

a first telephone number assigned to a called party;

a second telephone number assigned to a telephone line;

a telephone set connected to a called party end of said telephone line;

means for receiving a request from said telephone set over said telephone line indicating incoming telephone calls to said first telephone number of said called party are to be extended to said telephone line of said second telephone number wherein said request includes an input of digits of said first telephone number;

means responsive to a reception of said request for extending an incoming telephone calls for said first telephone number to said telephone line of said second telephone number; and means responsive to one of said incoming telephone calls not being completed for extending said one incoming call to said voice mail system; and means responsive to said reception of said request for preventing incoming calls to said second telephone number from being extended to said telephone line.

2. The telephone switching system of claim 1 further comprising:

means for maintaining a record of said request that incoming telephone calls specifying said first telephone number be extended to said telephone line of said second telephone number; and means responsive to a reception an incoming telephone call specifying said first telephone number for reading said record to determine said second telephone line number requested to receive incoming telephone calls for said first telephone number.

3. The telephone switching system of claim 1 wherein said voice mail system comprises:

means for receiving and storing a telephone message for said first telephone number; and means responsive to said incoming telephone call specifying said first telephone number not being completed to said telephone line of said second number for extending said incoming telephone call to said means for receiving and storing said telephone message.

4. The telephone switching system of claim 3 further comprising:

means responsive to a reception of said incoming telephone call for determining said first number is not assigned to a telephone line;

means responsive to a determination that said first telephone number is not assigned to a telephone line for extending said incoming telephone call to said means for receiving and storing said telephone message.

5. The telephone switching system of claim 1 wherein said means for preventing comprises:

means responsive to a reception of an incoming telephone call specifying said second telephone number for determining said telephone line having said second telephone number is assigned to said first telephone number; and means responsive to a determination that said telephone line of said second telephone number is assigned to said first telephone number for disconnecting said incoming telephone call.

6. The telephone switching system of claim 1 further comprising:

means for receiving a request to stop forwarding incoming calls for said first telephone number to said telephone line of said second telephone number.

7. The telephone switching system of claim 1 further comprising:

means responsive to a reception of said request for verifying an identity of said called party; and means responsive to said called party not being verified for preventing said incoming telephone calls for said first telephone number from being forwarded to said telephone line of said second telephone number.

8. A switching system for providing voice mail services to a called party that does not have a dedicated phone line associated with a telephone number, said system comprising:

a telephone line having a first end connected to said switching system;

a telephone station set connected to a second end of said telephone line;

a first telephone number assigned to a called party;

a second telephone number assigned to said telephone line;

a processor controlling connections to said telephone line to complete telephone calls;

a first set of instructions executed by said processor for directing said switching system to receive a request over said telephone line having said second number to extend incoming telephone calls specifying said first telephone number to said telephone line wherein said request includes digits of said first telephone number input by a user into said telephone station set;

a second set of instructions for directing said switching system to extend incoming telephone calls specifying said first telephone number to said telephone line having said second telephone number;

a third set of instructions for directing said switching system to forward said call to a voice mail system responsive to said incoming telephone call not being completed over said telephone line to said telephone station set;

A fourth set of instructions for directing said switching system to prevent incoming calls for said second telephone numbers from being extended to said telephone line responsive to said request to extend said incoming calls for said first telephone number to said telephone line: and a storage medium readable by said processor for storing said first second, third and fourth sets of instructions.

9. The system of claim 8 further comprising:

a database stored on storage medium readable by said processor for maintaining a record of said request to forward incoming telephone calls for said first telephone number to said telephone line having said second telephone number; and a first subset of said second set of instructions operative to read said record and determine which said telephone line is assigned to receive incoming telephone calls specifying said first telephone number responsive to a reception of said incoming telephone call specifying said first telephone number.

10. The system of claim 1 further comprising:

a subset said second set of instructions for directing said switching system to extend an incoming telephone call specifying said first telephone number to said voice messaging system responsive to said call not being completed over said telephone line.

11. The system of claim 9 further comprising:

a set of instructions for a log out process for receiving a request for incoming calls to said first telephone number not to be forwarded to said telephone line of said second telephone number.

12. The system of claim 9 further comprising:

a set of instructions for an identification process for receiving indicia that a called party has authority to forward said first number to said telephone line of said second number.

13. Method for extending incoming telephone calls to a proper telephone line in a switching system having a voice mail system supporting a user having a first telephone number comprising the steps of:

receiving a request over a telephone line having a second telephone number requesting incoming calls specifying said first telephone number be extended to said telephone line wherein said request includes digits of said first telephone number input by said user into a telephone station connected to said telephone line;

receiving an incoming telephone call;

determining a called number of said incoming call;

extending said incoming telephone call for said first telephone number to said telephone line of said second telephone number in response to said request;

forwarding said incoming telephone call to said voice mail system in response to said incoming telephone call not being completed to said telephone station connected to said telephone line; and preventing said incoming call for said second telephone number from being extended to said telephone line in response to said request.

14. The method of claim 13 further comprising the steps of:

updating a record in a database indicating said request for incoming calls to said first telephone number be extended to said telephone line of said second number;

reading said record in said database responsive to a reception of said incoming telephone call specifying said first telephone number; and determining which telephone line is to be used to complete said incoming telephone call specifying said first telephone number responsive to a reading of said record.

15. The method of claim 13 wherein said step of forwarding comprises the steps of:

extending said incoming telephone call to a voice mail system responsive to said incoming call not being completed over said telephone line;

completing said incoming call with said voice mail system;

determining which voice mail box receives said incoming telephone calls for said first telephone number;

receiving a message in said mail box; and storing said message in said voice mail box.

16. The method of claim 15 further comprising the steps of:

determining said first telephone number is not assigned to a telephone line responsive to a reception of said incoming telephone call; and extending said telephone call to said voice mail system.

17. The method of claim 13 further comprising the steps of:

receiving a log out indicating incoming calls for said first telephone number are not to be forwarded to said telephone line of said second telephone number; and forwarding all incoming telephone calls received subsequent to receiving said log out to a voice mail system.

18. The method of claim 13 further comprising the step of:

verifying a called party has authority to to request that incoming telephone calls to said first telephone number be extended to said telephone line .

* * * * *